United States Patent Office 3,746,699
Patented July 17, 1973

3,746,699
DEXTRIN AND STARCH ETHERS
Leslie P. Kovats, Granite City, Ill., assignor to Anheuser-Busch, Incorporated, St. Louis, Mo.
No Drawing. Filed May 19, 1971, Ser. No. 144,998
Int. Cl. C07c 48/18
U.S. Cl. 260—209 R          7 Claims

ABSTRACT OF THE DISCLOSURE

A process of cross-linking starch or dextrin with glycidyl methacrylate and/or glycidyl acrylate in a base catalyzed reaction is disclosed. The cross-linked starch or dextrin has improved resistance to swelling and is useful in adhesive compositions.

BACKGROUND OF THE INVENTION

This invention relates to a method for improving the properties of starch or dextrin, and in particular it relates to a process for cross-linking starch or dextrin by means of glycidyl methacrylate (GMA) or glycidyl acrylate and to adhesive compositions prepared from the derived products. More particularly, the present invention relates to the preparation of derivatized and slightly inhibited starches and dextrins.

When starch is treated with glycidyl methacrylate or glycidyl acrylate, various of its properties are improved. In particular, its resistance to swelling by water is improved. By the term inhibited starch, I mean a cross-linked linked starch in which the swelling of the starch granules in water is restricted and also delayed under conditions in which regular untreated starch granules ordinarily would disintegrate. The disintegration of the starch granules in hot water is called gelatinization and the product is known as gelatinized starch.

Hereinafter, whenever the term glycidyl methacrylate is used, it should be understood that the glycidyl acrylate and mixtures of glycidyl methacrylate and glycidyl acrylate also are useful.

The degree of cross-linking can be varied over a wide range so as to produce a slightly or a highly inhibited starch product.

Glycidyl methacrylate can be reacted with polyhydroxy compounds such as starch and dextrin to produce the corresponding ether derivatives. I have found that the reaction of glycidyl methacrylate with starch (or dextrin) in presence of sodium hydroxide catalyst can be easily directed to afford a derivatized and slightly inhibited starch product. The reaction is accelerated by heat and in presence of sodium hydroxide catalyst, but the alkalinity of the slurry must not be so great as to cause the gelatinization of the starch.

Accordingly, it is a principal object of this invention to provide a process whereby improved dextrins and partially inhibited starches may be prepared economically. A more specific object of the invention is to provide a method where the cross-linking of the starch (or dextrin) is accomplished by the use of glycidyl methacrylate in presence of sodium hydroxide catalyst.

A further object of the invention is to provide adhesive compositions characterized by improvement in such properties as adhesion bond-strength and quick tack.

Another object of this invention is to provide a process for producing cross-linked starches which can be used for the preparation of adhesives and binders in warp sizing.

Still another object is to provide cross-linked starches which will form a non-cohesive paste when cooked up with water.

Although they are not essential in the preparation of adhesives and binders, additives, such as preservatives and defoamers, may be incorporated into the composition.

These and other objects and advantages will become apparent hereinafter.

The present invention comprises a process for reacting a starch product or a dextrin product to produce an ether of glycidyl methacrylate which is resistant to swelling in water. The invention further comprises the reaction product of the foregoing process and the adhesives made therefrom.

DETAILED DESCRIPTION

The reaction between the starch and glycidyl methacrylate is preferably carried out at an elevated temperature (for example at 127° F.) and in about five hours time. The amount of glycidyl methacrylate may vary widely depending upon the degree of cross-linking and the properties desired. The amount of glycidyl methacrylate should be within the range of about 0.5 to about 10 percent, preferably about 1%, based on the weight of starch. The starch slurry has a starch concentration of about 20° Bè or 40.8% solids. The pH of the starch slurry should be about 9 to about 11.6, preferably about 11. The temperature can vary between about 110° F. to about 130° F. and the reaction time between about 2 to about 6 hours.

The preferred alkaline catalyst is sodium hydroxide in an amount between about 0.4% to about 0.5% by weight based on the weight of starch. Other basic materials usable include the alkaline earth and alkaline metal hydroxides. The base is added in a manner to keep the pH of the reaction mixture at the desired level.

The cross-linked starch reaction product has a degree of substitution of between about 0.0056 to about 0.12, preferably about 0.01. The fluidity range of these products is about 0 to about 50.

After the reaction, the product is filtered on a Büchner-type filter, washed, and dried in a circulated air dryer at 80° C.

As previously mentioned, the reaction between the starch and glycidyl methacrylate is preferably carried out at around pH 11, however, in this pH range some reagent hydrolysis may also occur. The hydrolysis products of glycidyl methacrylate also are believed to react with starch and yield mixed derivatives in addition to the cross-linked starch. These also can be made into adhesives.

Also included within the scope of the invention and the term starch based products are certain modified starches such as hydroxyethyl and hydroxypropyl starches. Other suitable starches include waxy maize starch, acid modified starches, and oxidized starches.

The reactants usable in this invention include glycidyl acrylate, glycidyl methacrylate, and mixtures thereof.

The dextrin derivatives are prepared by heating an alkaline dextrin with glycidyl methacrylate in a substantially dry state. The dextrin derivatives also can be used for various adhesive applications.

The process comprises heating a dextrin containing about 8% moisture in the presence of about 4% by weight glycidyl methacrylate (based on the weight of dextrin) at a temperature of about 200° F. for approximately three hours and recovering the resulting etherified product. It is desirable to have the starting materials (dextrin and glycidyl methacrylate) in as finely divided state as possible and this may be accomplished by known methods such as grinding and blending prior to the heating process. The dextrin is about 40 to 80 mesh in size, preferably 40 mesh. The glycidyl methacrylate is a liquid. The starting dextrin has about 30% to about 90% solubles and a degree of fluidity of about 25 to about 95.

The moisture content of the reaction mixture composed of the dextrin and glycidyl methacrylate at the time the reaction starts should be within the range of 3 to about 10%, and preferably is about 8% (based on the total weight of reactants). The moisture content of the reaction mixture is maintained between about 2 and about 9% by weight of reactants during the reaction.

The reactants are treated in a conventional dextrin roaster for about 2 to about 6 hours, preferably about three hours.

The reaction temperature may be 190° F. to 220° F., preferably about 200° F. When a higher reaction temperature is used, it is necessary to shorten the reaction time in order to avoid decomposition of the product.

The final water content of the product is 2 to about 9% by weight of final product.

The dextrin preferably is mixed with glycidyl methacrylate and a dilute NaOH solution before being reacted in a dextrin roaster.

Suitable dextrins usable in this invention and included in the term, starch based products, are white and yellow dextrins made by roasting of starches in the presence of an acid catalyst, and British gums prepared by roasting starch in the absence of an acid catalyst.

The dextrins and British gums are made alkaline by dispersing a 2% aqueous sodium hydroxide solution in the material before the reaction.

The amount of the reactant used and the degree of substitution of the final product are similar to that for the starch-glycidyl methacrylate product. The final product has a degree of fluidity of about 25 to 95 and a solubles content of about 8 to 100%.

The present invention is carried out between starch and glycidyl methacrylate as outlined in the following examples. The changes of the physical properties of the starch and dextrin reaction products in regards to viscosity, gelatinization, paste characteristics and adhesive properties, is shown in the tables following each of the examples wherein the particular reaction produced is compared to the unreacted starting material. The measurements are done on a Corn Industries viscometer (C.I.V.), where viscosity changes of an aqueous suspension of the product are recorded during a controlled temperature cycle. The adhesive properties of the dextrin derivatives were evaluated in Kraft paper and aluminum foil laminations.

The following examples are illustrative of the products and processes of the present invention, but are not to be construed as limiting.

EXAMPLE I

Glycidyl methacrylate was used to etherify pearl starch in a base catalyzed slurry reaction. 6 g. of glycidyl methacrylate was added to a well agitated starch slurry containing 500 g. of pearl starch in 650 ml. water and the pH was adjusted to 10.5 with dilute sodium hydroxide solution. The reaction was run for 5 hours at 122° F. with constant agitation; then the pH adjusted to 7.0 and the product was filtered, washed several times with water and dried. The product gelled at 80.5° C. when mixed with water at 5% solids. The untreated pearl starch control gelled at 84.5 at 5% solids (pH 7.0).

CIV DATA

| Sample | Gel temp., °C. | Max. | 30 min. | Quick cold | Aged paste |
|---|---|---|---|---|---|
| Pearl starch GMA derivative | 80.5 | 120 | 70 | 170 | 125×8 |
| Pearl starch control | 84.5 | 162 | 140 | 185 | Solid. |

EXAMPLE II 55 g. of glycidyl methacrylate was added in 5 ml. portions to a well agitated starch slurry containing 1000 g. of acid modified (60 fluidity) corn starch in 1200 ml. water and enough sodium hydroxide to maintain the pH at 11 during the reaction. The reaction was run for five hours at 127° F., then the pH of the slurry was adjusted to 7.0 with dilute hydrochloric acid and the product was filtered, washed several times with water and dried. The product is a crosslinked starch, which upon cooking with water yields a noncohesive starch paste. The product gelled at 72° C. at 10% solids (pH 7.0).

CIV DATA

| Sample | Dry phase fluidity | Gel temp., °C. | Max. | 30 min. | Quick cold | Aged paste |
|---|---|---|---|---|---|---|
| GMA starch derivative | 22 | 72 | 4×125 | 127 | 2×180 | 600 |
| Fluidity starch control | 67 | 73 | 2×103 | 0 | 205 | 850 |

The product is useful as a binder in warp sizing formulations.

EXAMPLE III 6 lbs. of white dextrin (70% solubles) was mixed with 150 ml. of 2% sodium hydroxide aqueous solution and 100 g. of glycidyl methacrylate in a Patterson-Kelley liquid-solids twin shell blender. The blend was heated in a dextrin roaster at 190 to 210° F. for 3¾ hours and the product was recovered. The adhesive made from this low D.S. dextrin ether derivative has shown excellent adhesion to various paper substrates. A paper laminating adhesive was formulated from the dextrin derivative, borax, sodium hydroxide and water.

Formula.—130 g. of glycidyl methacrylate dextrin derivative, 155 ml. of water, 2 g. of borax (10 H$_2$O) and 0.5 g. of 50% sodium hydroxide. The composition forms good quality films on paper and aluminum sheets (protective coatings). The dextrin control did not perform in these applications as well as the GMA-dextrin derivative. The dextrin control shows very poor adhesion to aluminum foil.

EXAMPLE IV

In a similar dry phase reaction 10 lbs. of white dextrin (30% solubles) was blended with 200 ml. of 2% sodium hydroxide solution and 210 g. of GMA, then the blend was heated in a dextrin roaster at 200° F. for 3½ hours and the product was recovered. The dextrin derivative was cooked up in the following adhesive formula with borax and evaluated. This adhesive was useful in Kraft paper laminations.

Formula.—200 g. of GMA dextrin derivative, 260 ml. of water, 1.2 g. of borax (10 H$_2$O) and 1 g. of 30% sodium hydroxide. An improved bond strength was observed with the GMA-dextrin derivative, when compared with the regular dextrin control.

This invention is intended to cover all changes and modifications of the example of the invention herein chosen for purposes of the disclosure which do not constitute departures from the spirit and scope of the invention.

What is claimed is:

1. A method of making ethers of starch based products consisting essentially of the steps of reacting from about 99.5 to about 90 parts starch based reactant (dry solids basis) selected from the group consisting of starch, acid modified starch, oxidized starch, hydroxyethyl starch, hydroxypropyl starch, and dextrin with from about 0.5 to about 10 parts acrylate selected from the group consisting of glycidyl acrylate, glycidyl methacrylate and mixtures thereof at a pH of between about 9 and about 11.6 and at a reaction temperature maintained between about 110° F. to about 220° F., the moisture level during the reaction being maintained in the range of about 2 to about 9% based on the weight of total ingredients, and recovering a cross-linked starch based ether of about 0.0056 to about 0.12 degree of substitution.

2. The method of claim 1 wherein the starch based reactant is an unmodified, oxidized or thin boiling starch of about 0 to 90 degree fluidity.

3. The method of claim 1 wherein the starch based reactant is a dextrin of about 25 to 95 degree fluidity and about 8% to 100% solubles.

4. The method of claim 1 wherein the time of reaction is about 2 to 6 hours.

5. The reaction of claim 1 wherein the starch based reactant has a mesh size of 40 to 80.

6. The reaction of claim 1 wherein NaOH is used to achieve the pH of about 9 to 11.6.

7. A cross-linked product consisting essentially of a starch based reactant selected from the group consisting of starch, acid modified starch, oxidized starch, hydroxyethyl starch, hydroxypropyl starch, and dextrin and acrylate selected from the group consisting of glycidyl acrylate, glycidyl methacrylate and mixtures thereof, said product having about 0.0056 to 0.12 degree of substitution and about 0 to 95 fluidity.

References Cited
UNITED STATES PATENTS

| | | | |
|---|---|---|---|
| 3,275,576 | 9/1966 | Flodin et al. | 260—209 R |
| 3,459,731 | 8/1969 | Gramera et al. | 260—209 D |
| 3,506,676 | 4/1970 | Tesoro et al. | 260—233.3 R |
| 3,555,008 | 1/1971 | Johnson | 260—233.3 R |

ELBERT L. ROBERTS, Primary Examiner

J. R. BROWN, Assistant Examiner

U.S. Cl. X.R.

106—162, 205, 210; 260—233.3 R